(12) United States Patent
Atkins

(10) Patent No.: US 11,183,143 B2
(45) Date of Patent: Nov. 23, 2021

(54) TRANSITIONING BETWEEN VIDEO PRIORITY AND GRAPHICS PRIORITY

(71) Applicant: Dolby Laboratories Licensing Corporation, San Francisco, CA (US)

(72) Inventor: Robin Atkins, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/667,571

(22) Filed: Oct. 29, 2019

(65) Prior Publication Data

US 2020/0066225 A1 Feb. 27, 2020

Related U.S. Application Data

(60) Division of application No. 15/718,268, filed on Sep. 28, 2017, now Pat. No. 10,460,699, which is a
(Continued)

(30) Foreign Application Priority Data

Jul. 22, 2016 (EP) .................................... 16180680

(51) Int. Cl.
*G09G 5/00* (2006.01)
*G09G 5/10* (2006.01)
(Continued)

(52) U.S. Cl.
CPC ............. *G09G 5/005* (2013.01); *G09G 5/006* (2013.01); *G09G 5/10* (2013.01); *G09G 5/363* (2013.01);
(Continued)

(58) Field of Classification Search
None
See application file for complete search history.

(56) References Cited

U.S. PATENT DOCUMENTS 7,987,484 B2 7/2011 Sloo
8,886,846 B2 11/2014 Hussain
(Continued)

FOREIGN PATENT DOCUMENTS

CN 101416227 4/2009
CN 101542539 9/2009
(Continued)

OTHER PUBLICATIONS

Atkins et al. (PCT/US2014/016304) (Year: 2014).*
(Continued)

*Primary Examiner* — Kyle Zhai

(57) ABSTRACT

A processor receives input video data of a video dynamic range and input dynamic metadata. It also receives: input graphics data of a graphics dynamic range and input static metadata, display identification data from a target display over a video interface, and a blending priority map characterizing a per-pixel priority of output pixels in an image generated by blending the input video data and the input graphics data. A video mapping function and a graphics mapping function which map data from the input video and graphics dynamic ranges to the target dynamic range are generated based on the dynamic and static metadata. Then, the input and graphics data are blended based on the blending priority map and a per-pixel decision to map pixels to the target dynamic range using either the video mapping function or the graphics mapping function.

3 Claims, 10 Drawing Sheets

Related U.S. Application Data continuation-in-part of application No. PCT/US2017/034593, filed on May 25, 2017.

(60) Provisional application No. 62/342,676, filed on May 27, 2016.

(51) Int. Cl.
| | | |
|---|---|---|
| *G09G 5/377* | (2006.01) | |
| *H04N 5/445* | (2011.01) | |
| *G09G 5/36* | (2006.01) | |
| *H04N 5/57* | (2006.01) | |

(52) U.S. Cl.
CPC ......... *G09G 5/377* (2013.01); *H04N 5/44504* (2013.01); *H04N 5/57* (2013.01); *G09G 2320/0271* (2013.01); *G09G 2320/066* (2013.01); *G09G 2340/0428* (2013.01); *G09G 2340/10* (2013.01); *G09G 2340/12* (2013.01); *G09G 2340/125* (2013.01); *G09G 2360/02* (2013.01); *G09G 2370/04* (2013.01); *G09G 2370/042* (2013.01); *G09G 2370/12* (2013.01)

(56) References Cited

U.S. PATENT DOCUMENTS

| | | |
|---|---|---|
| 8,887,048 B2 | 11/2014 | Nordhagen |
| 9,277,273 B2 | 3/2016 | He |
| 2006/0050076 A1 | 3/2006 | Jeong |
| 2009/0062944 A1 | 3/2009 | Wood |
| 2013/0089138 A1 | 4/2013 | Guo |
| 2013/0229581 A1 | 9/2013 | Joshi |
| 2013/0328907 A1 | 12/2013 | Ballestad |
| 2014/0002478 A1 | 1/2014 | Ballestad |
| 2014/0210847 A1 | 7/2014 | Knibbeler |
| 2014/0232614 A1 | 8/2014 | Kunkel |
| 2014/0363093 A1 | 12/2014 | Miller |
| 2015/0156469 A1 | 6/2015 | Qu |
| 2015/0256860 A1 | 9/2015 | Kunkel |
| 2015/0269255 A1 | 9/2015 | Jiang |
| 2015/0326638 A1 | 11/2015 | Yarygin |
| 2015/0341611 A1 | 11/2015 | Oh |
| 2015/0350641 A1 | 12/2015 | Zhou |
| 2016/0005349 A1 | 1/2016 | Atkins |
| 2016/0044277 A1 | 2/2016 | Oh |
| 2016/0080716 A1 | 3/2016 | Atkins |
| 2016/0105695 A1 | 4/2016 | Qu |
| 2016/0360171 A1 | 12/2016 | Tao |
| 2016/0365065 A1 | 12/2016 | Wu |

FOREIGN PATENT DOCUMENTS

| | | |
|---|---|---|
| CN | 101742136 | 6/2010 |
| CN | 102414738 | 4/2012 |
| CN | 102906810 | 1/2013 |
| CN | 103091843 | 5/2013 |
| CN | 104581437 | 4/2015 |
| WO | 2012003984 | 1/2012 |
| WO | 2014130213 | 8/2014 |
| WO | 2015050857 | 4/2015 |
| WO | 2016038950 | 3/2016 |

OTHER PUBLICATIONS

ITU-R BT.1886 "Reference electro-Optical Transfer Function for Flat Panel Displays Used in HDTV Studio Production" Mar. 2011.

ITU-R Recommendation ITU-R BT.1886 "Reference Electro-Optical Transfer Function for Flat Panel Displays Used in HDTV Studio Production" Mar. 2011, pp. 1-7.

SMPTE 2084:2014 "High Dynamic Range Electro-Optical Transfer Function of Mastering Reference Displays" Aug. 16, 2014.

SMPTE ST 2084:2014 "High Dynamic Range Electro-Optical Transfer Function of Mastering Reference Displays".

Stessen J. et al "Chromaticity Based Color Signals for Wide Color Gamut and High Dynamic Range" ISO/IEC JTC1/SC29/WG11 MPEG2014/M35065, Oct. 2014, pp. 1-18.

Stessen, J. et al "Chromaticity Based Color Signals for Wide Color Gamut and High Dynamic Range" ISO/IEC JTC1/SC29/WG11 MPEG 2014, Oct. 2014.

\* cited by examiner

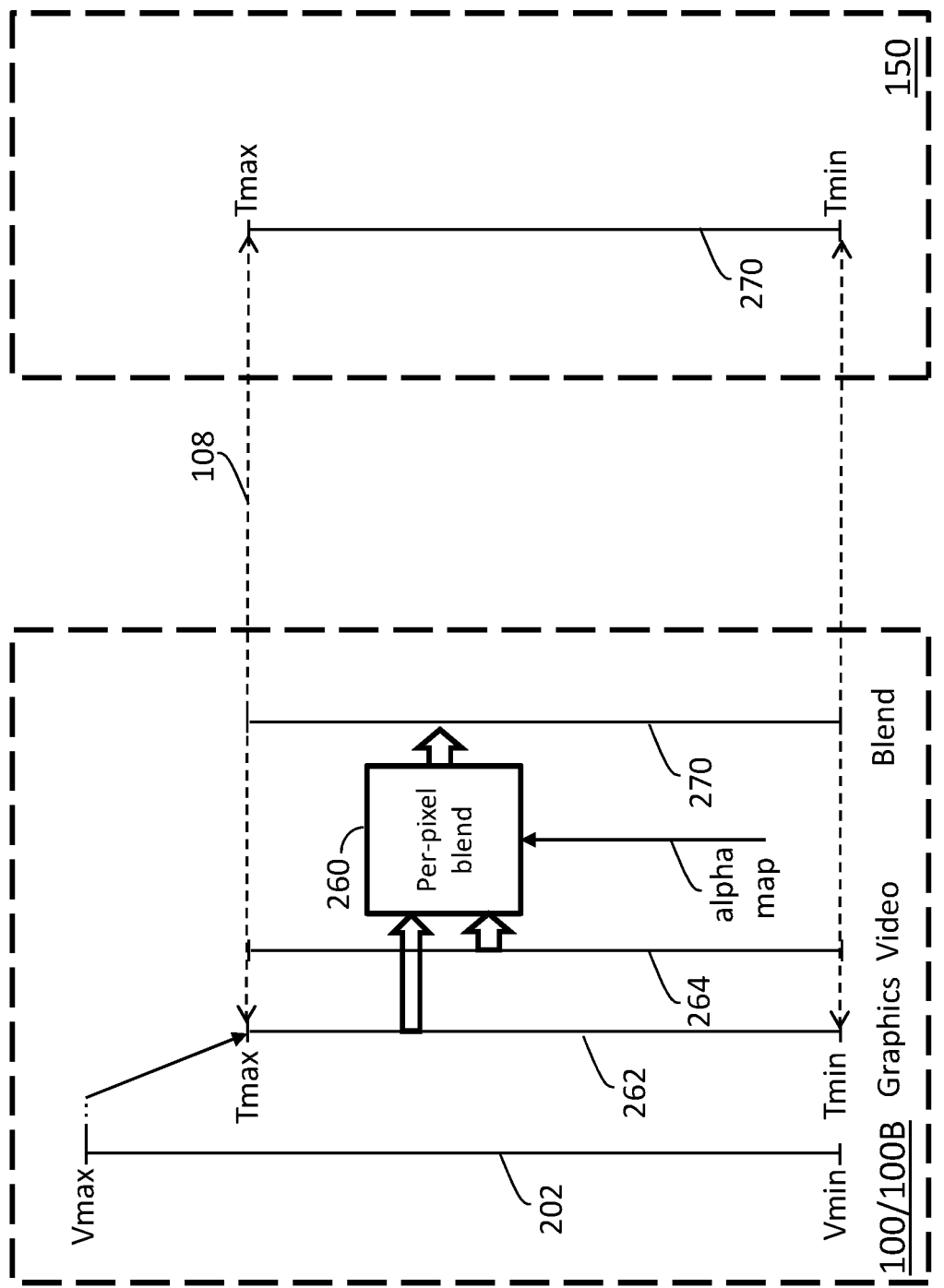

TRANSITIONING BETWEEN VIDEO PRIORITY AND GRAPHICS PRIORITY

CROSS-REFERENCE TO RELATED APPLICATIONS

This application is a divisional of U.S. patent application Ser. No. 15/718,268, filed on Sep. 28, 2017, which is a continuation-in-part of PCT Application PCT/US2017/034593, filed on May 25, 2017, which claims the benefit of priority to U.S. Provisional Patent Application 62/342,676, filed on May 27, 2016, and EP Application 16180680.7, filed on Jul. 22, 2016, each of which is incorporated herein by references in its entirety.

TECHNOLOGY

The present invention relates generally to images. More particularly, an embodiment of the present invention relates to transitioning between video priority and graphics priority in connection with blending graphics with video content.

BACKGROUND

As used herein, the term 'dynamic range' (DR) may relate to a capability of the human visual system (HVS) to perceive a range of intensity (e.g., luminance, luma) in an image, e.g., from darkest blacks (darks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n<8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m2 or nits. Most consumer HDTVs range from 300 to 500 nits with new models reaching 1000 nits (cd/m2). Such displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety.

As used herein, the term "display management" denotes the processing (e.g., tone and gamut mapping) required to map an input video signal of a first dynamic range (e.g., 1000 nits) to a display of a second dynamic range (e.g., 500 nits). Examples of display management processes are described in PCT Application Ser. No. PCT/US2014/016304 (the '304 application), filed on Feb. 13, 2014, "Display management for high dynamic range video," by R. Atkins et al., which is incorporated herein by reference in its entirety. Display management may be assisted or controlled by input metadata generated by the source of the incoming content and multiplexed into the coded bitstream.

In some use cases, video content in a video signal may also be blended by graphics of a third dynamic range (e.g., 100 nits, 400 nits, etc.) before being sent to the target display. As used herein, the term 'graphics' denotes any kind of imagery (e.g., menus, still pictures, vector graphics, video, and the like) that may be blended with a video signal. As appreciated by the inventors here, improved techniques for blending graphics with video content that can be used to support a wide variety of display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 2E illustrates a second example of pixel-based blending mode according to an embodiment of this invention;

DESCRIPTION OF EXAMPLE EMBODIMENTS

Figure 1A:
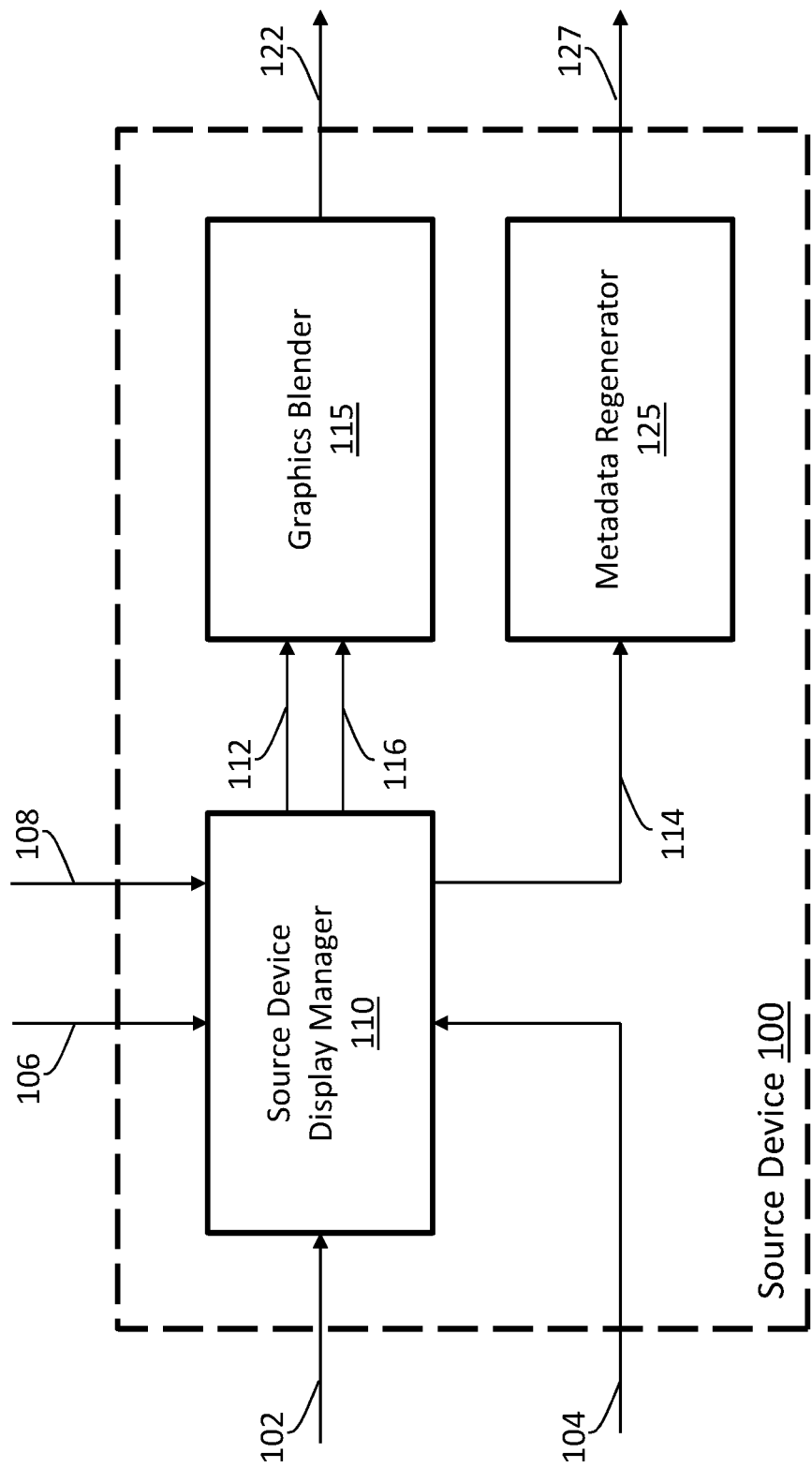
FIG. 1A and FIG. 1C depict examples of source devices according to embodiments of this invention.

Transitioning between video priority and graphics priority in connection with blending graphics with video content are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to blending graphics data. In a video receiver, input video data and input dynamic metadata for the input video data is received. The input video data is at a video dynamic range. Input graphics data at a graphics dynamic range different from the video dynamic range is received. Display identification data is received from a target display to which the video receiver is linked over a video interface. Interpolated dynamic metadata is generated based at least in part on (a) the input dynamic metadata, (b) the display identification data, and (c) a numeric interpolation factor, to operate a priority-transition mode for transitioning between a video-priority mode and a graphics-priority mode. The input video data and the input graphics data is blended into graphics blended video data based at least in part on the interpolated dynamic metadata. The graphics blended video data and the interpolated dynamic metadata is sent to the target display for rendering graphics blended images represented in the graphics blended video data.

In an embodiment, tone-mapped video data of a source dynamic range is generated from the input video data of the video dynamic range by mapping the video dynamic range of the input video data to the source dynamic range as specified in the interpolated dynamic metadata. Mapped graphics data of the source dynamic range is generated from the input graphics data of the graphics dynamic range by mapping the graphics dynamic range of the input graphics data to the source dynamic range specified in the interpolated dynamic metadata. The graphics blended video data is generated by blending the tone-mapped video data of the source dynamic range and the mapped graphics data of the source dynamic range.

In an embodiment, in a video receiver, a processor receives: input video data and input dynamic metadata for the input video data, wherein the input video data is at a video dynamic range, input graphics data and input static metadata, wherein the input graphics data is at a graphics dynamic range, display identification data from a target display to which the video receiver is linked over a video interface, and a blending priority map characterizing a per-pixel priority of output pixels in an image generated by blending the input video data and the input graphics data. The processor blends the input video data and the input graphics data to generate blended video data, and sends the blended video data, the input dynamic metadata, the input static metadata, and the blending priority map to the target display for rendering the blended video data at a target dynamic range, wherein the target display decides on how to map pixels to the target display based on the blending priority map and two distinct tone mapping curves: one for video-priority data and one for graphics-priority data.

In an embodiment, in a video receiver, a processor receives a blended video input comprising blended video and graphics data. It also receives input dynamic metadata for the video data in the blended video input, input static metadata for the graphics data in the blended video input, and a blending priority map characterizing the per-pixel priority (video or graphics) of the pixels in the blended video input. The receiver receives a target display dynamic range from a target display to which the video receiver is linked over a video interface. Next, the processor generates using the input dynamic metadata data a video tone-mapping function to map pixels in the blended video input to output data in the target dynamic range. It also generates using the input static metadata data a graphics tone-mapping function to map the pixels in the blended video input to output data in the target dynamic range. The processor renders blended video output data at the target dynamic range based on the blended video input data, the video tone-mapping function, the graphics tone-mapping function, and the blending priority map, and sends the blended video output data to the target display.

Example Source Device and Target Display

Figure 1B:
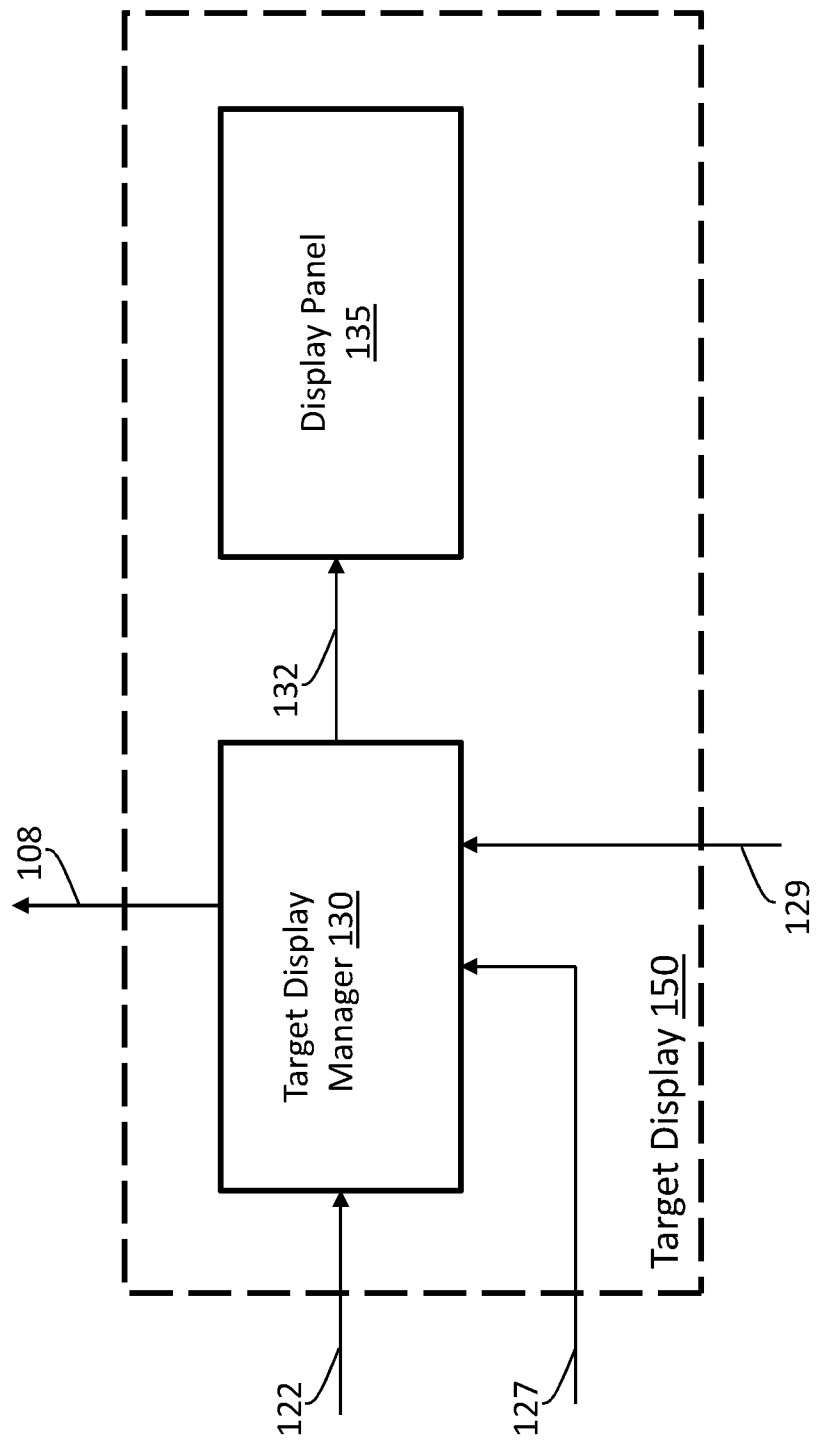
FIG. 1B depicts an example target display according to an embodiment of this invention.

Assuming an incoming coded video bit stream (e.g., an EDR video bit stream and the like) has been properly decoded, FIG. 1A depicts an embodiment of an example source device 100, for generating a source video signal for a target display (e.g., 150 of FIG. 1B and the like). The source device (100) acts as a video source for the target display (150) by providing the source video signal to the target display (150) over a video interface such as a High-Definition Multimedia Interface (HDMI) interface and the like. The source video signal, as generated by the source device (100) and then sent to the target display (150), may comprise source video data 122 and source metadata 127.

FIG. 1B depicts an embodiment of an example target display 150 which may include a target display manager 130 and a display panel 135. The target display (150) may provide display identification data to, and receive a source video signal outputted from, the source device (100) over the video interface. Examples of display identification data may include, but are not necessarily limited to only, any of: extended display identification data (EDID), E-EDID, DisplayID, etc.

Any, some, or all components (e.g., as illustrated in FIG. 1A and FIG. 1B, etc.) of the source device (100) and the target display (150) may be at least in part implemented with software, hardware, or a combination of software and hardware.

Given the source video data (122) and the source metadata (127) as received in the source video signal generated by the source device (100), target display manager (130) adjusts the luminance and color of the source video data (122) to match the dynamic range and color gamut of the display panel (135). The target display manager (130) may perform at least some of its video processing operations based in part on a TV viewing profile 129 (e.g., 2D mode, 3D mode, movie mode, vivid mode, and the like) as selected by a user, based in part on other environmental parameters (e.g., ambient light), etc. Video data 132 generated by the target display manager (130) after the video processing operations is then rendered on the display panel (135).

As used herein, the term "source device" denotes any device that receives input digital media content (e.g., video, pictures, music, and the like) to play it back on a television, monitor, or other display. Examples of source devices include digital media devices, digital media receivers, set-top boxes, gaming machines (e.g., an Xbox), general purpose personal computers, tablets, dedicated digital media receivers such as the Apple TV or the Roku box, etc.

The incoming coded video bit stream as received by the source device (100) may be decoded by the source device (100) into input video data 102 and input dynamic metadata 104. As depicted in FIG. 1A, the source device (100) further receives input graphics data 106. Input video data (102) may comprise a sequence of input images. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

The input video data (102) may be in an RGB color format or any other color space, such as YCbCr, XYZ, and the like. Input images represented in the input video data (102) may have been color graded on a reference monitor (e.g., an EDR monitor and the like) which may have different dynamic range and color gamut characteristics than a target display. As used herein, the term "color grading" denotes the process of adjusting local and global color components (including but not limited to luma related values and chroma related values) in (spatial regions of, image details of, etc.) one or more input images (e.g., video, scenes, group of pictures (GOP), individual pictures, etc.) to correct color artifacts and/or to match artistic intent (e.g., director's intent, color grader's intent, a video professional's intent, etc.).

Input dynamic metadata (104) may include reference display metadata related to a reference display used to color grade input images represented in the input video data (102) during program production that generates the input video data (102). For example, such metadata may include the reference electro-optical transfer function (EOTF) as defined by Recommendation ITU-R BT.1866 (March 2011). The input dynamic metadata (104) may also include additional display and content metadata, such as the maximum and minimum brightness of the reference display, the maximum, minimum, and average mid-tone of image data in one or more input images, and the intensity of ambient light during color grading. As used herein, the term "content metadata" may refer to content-dependent metadata that is adjusted on a per-frame or a per-scene basis, or whenever there is a certain change (e.g., over a certain threshold, etc.) as detected in image content of a sequence of frames. If there are no metadata related to the input video data (102), then in some embodiments the source device (100) may extract such data by analyzing image content (e.g., minimum luminance, maximum luminance, mean luminance, etc.) in the input video data (102). As used herein, the terms "scene" or "shot" denote a series of sequential-in-capture frames that may share the same overall brightness characteristics. Content metadata specifying scene cuts may also be part of the input dynamic metadata (104).

In some embodiments, input graphics data (106) (e.g., captions, menus and other overlays, etc.) may be available in a graphics-specific color space and dynamic range (e.g., Rec. 709 at 100 nits, 400 nits, etc.), which is different than the color space and dynamic range of the input video data (102). To make things more complicated, the dynamic range of input graphics in the source device (100) may also be different than the maximum dynamic range supported by the target display manager (135) of the target display (150).

As depicted in FIG. 1A, in an embodiment, the source display manager (110) uses the input video data (102), the input graphics data (106), the EDID (108), the input dynamic metadata (104), etc., to generate or determine pre-blending video data 112 and pre-blending graphics data 116. More specifically, in some embodiments, an image mapping operation may be performed on one or more input images with a reference dynamic range as represented in the input video data (102) to one or more tone-mapped images with a tone-mapped dynamic range; a graphics mapping operation may be performed on one or more input graphics as represented in the input graphics data (106) to one or more inversely tone-mapped graphics with the same tone-mapped dynamic range. The tone-mapped images and the inversely tone-mapped graphics with the same tone-mapped dynamic range are then blended by graphics blender 115 into one or more graphics blended images in the source video data (122). It should be noted that in some embodiments in which the source device (100) operates in a video-priority mode, the tone-mapped dynamic range may be set to the reference dynamic range; thus in these embodiments, the image mapping operation acting on the one or more input images may not comprise a dynamic range mapping, or may become a null operation that does not alter the dynamic range of the one or more input images.

In an embodiment, one or both of the source display manager (110) and the target display manager (130) may be implemented based on the tone-mapping and inverse tone-mapping methods described in U.S. Pat. No. 8,593,480, "Method and apparatus for image data transformation," by A. Ballestad and A. Kostlin, which is incorporated herein by reference in its entirety. An example of such an implementation is described in the '304 application; however, alternative mapping techniques may also be applied.

In some embodiments, graphics blending is performed in an IPT-PQ color space; however, graphics blending as described herein may also be performed in other color spaces, such as linear RGB, gamma RGB, YCbCr, XYZ, CIE-Lab, and the like. Some examples of graphics blending are described in U.S. patent application Ser. No. 14/631,950, filed on Feb. 26, 2015, "Graphics Blending for High Dynamic Range Video," by Timo Kunkel, et al., which is incorporated herein by reference in its entirety.

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. Examples of PQ mapping functions are described in PCT Application with Ser. Number PCT/US2012/068212 titled "Perceptual luminance nonlinearity-based image data exchange across different display capabilities," by J. S. Miller et al., filed on Dec. 6, 2012, and incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as determined by the '212 application, imitates the true visual response of the human visual system using a relatively simple functional model.

An example of an EOTF based on a PQ curve is defined in SMPTE ST 2084:2014 "High Dynamic Range EOTF of Mastering Reference Displays," which is incorporated herein by reference in its entirety. Another example of a perceptually-quantized EOTF is presented in "Chromaticity based color signals for wide color gamut and high dynamic range," by J. Stessen, et al., ISO/IEC JTC1/SC29/WG11 MPEG2014/M35065, October 2014, which is incorporated herein by reference in its entirety.

Consider again the input video data (102) and its input dynamic metadata (104). If there is no requirement for video compositing (e.g., blending input images as represented in the input video data (102) with input graphics as represented in the input graphics data (106)), then both input video data (102) and the input dynamic metadata (104) may be passed to the target display (150) with no transformation. If there is a requirement for video compositing, then in addition to graphics blending, a metadata regenerator (125) may regenerate metadata in the form of the source metadata (127) that can be used by the target display (150) for decoding, tone-mapping and rendering graphics blended images. The regeneration of the source metadata (127) by the metadata regenerator (125) may be at least in part based on metadata 114 used in source display management operations performed by the source device (102).

The source device (100) may operate in three different (e.g., steady-state, etc.) operational modes in connection with generating graphics blended images in the source video data (122). The first operational mode is a video-priority mode. The second operational mode is a graphics-priority mode. The third operational mode is a priority-transition mode.

Example Video-Priority Mode

Figure 2A:
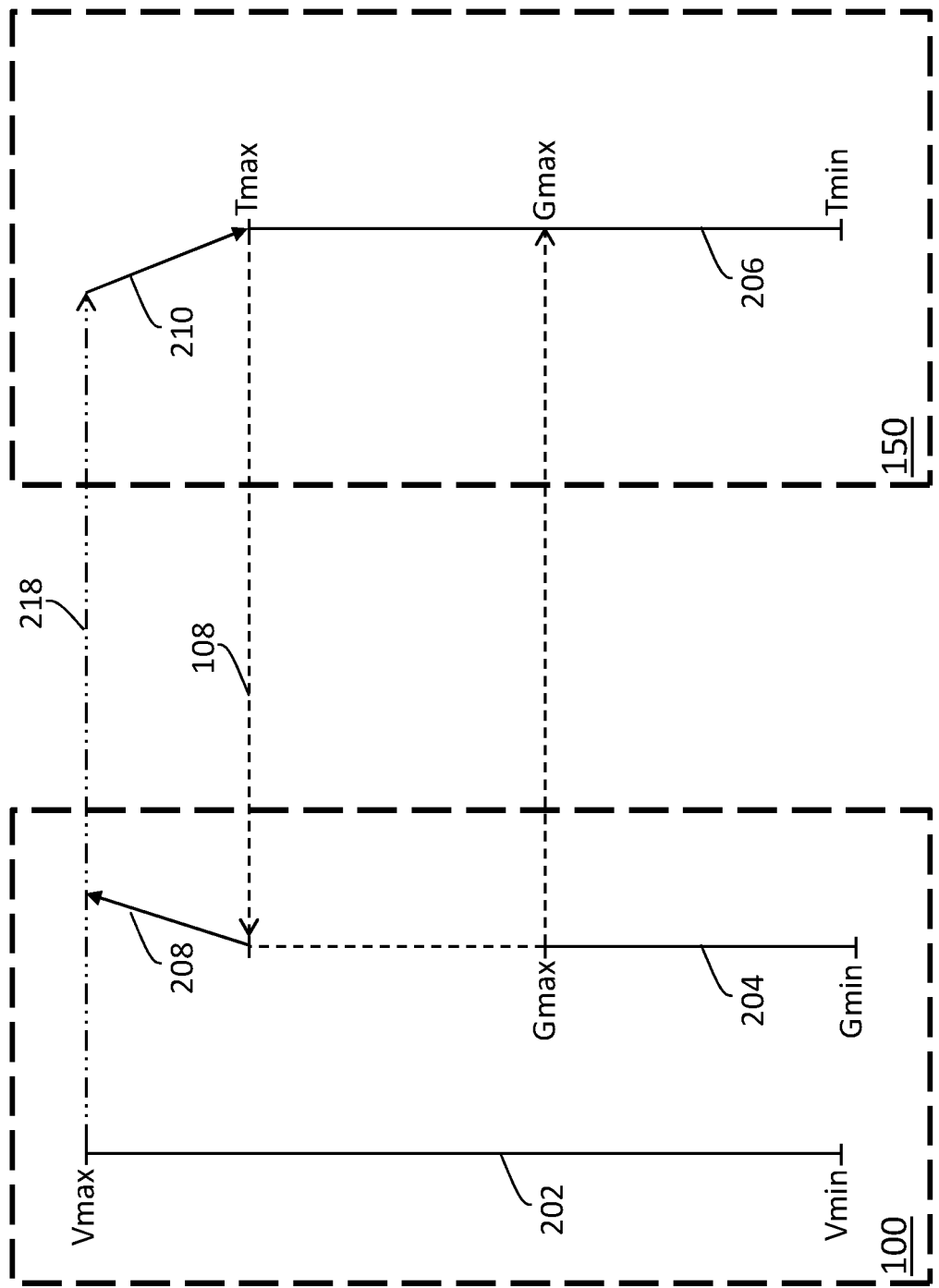
FIG. 2A illustrates an example video-priority mode according to an embodiment of this invention.

FIG. 2A illustrates an example first operational mode (or video-priority mode). In the video-priority mode, the source device (100) receives the input coded bitstream, and decodes the input coded bitstream into the input video data (102) and the input dynamic metadata (104).

For the purpose of illustration, the input video data (102) is of a reference dynamic range 202 spanning between the reference minimum luminance (e.g., 0.03 nits, etc.) denoted as "Vmin" and the reference maximum luminance (e.g., 4,000 nits, etc.) denoted as "Vmax", as specified in the input dynamic metadata (104). The input graphics data (106) is of a graphics dynamic range 204 spanning between the graphics minimum luminance (e.g., 0 nits, etc.) denoted as "Gmin" and the graphics maximum luminance (e.g., 400 nits, etc.) denoted as "Gmax".

In response to detecting that there exist no input graphics in the input graphics data (106) for the input images in the input video data (102) to be blended with, the source device (100) packs the input video data (102) and the input dynamic metadata (104) in a signal format in compliance with standards/specifications governing the video interface between the source device (100) and the target display (150), and outputs the input video data (102) as the source video data (122) and the input dynamic metadata (104) as the source metadata (127) directly to the target display (150) via the video interface. The source device (100), or the metadata regenerator (125) therein, may be free from performing metadata remapping or regeneration.

On the other hand, in response to detecting that there exist input graphics in the input graphics data (106) for the input images in the input video data (102) to be blended with, the source device (100), or the source display manager (110) therein, performs a first mapping operation 208 that inversely tone-maps these input graphics into inversely tone-mapped graphics in the reference dynamic range (202) as indicated in the input dynamic metadata (104). The first mapping operation (208) may include a mapping from a target dynamic range 206 as indicated in the EDID (108) to the reference dynamic range (202). The target dynamic range (206) spans between the target minimum luminance (e.g., 0.05 nits, etc.) denoted as "Tmin" and the target maximum luminance (e.g., 850 nits, etc.) denoted as "Tmax", as specified in the EDID (108).

The graphics blender (115) receives the input images with the reference dynamic range (202) as pre-blending video data 112 and the inversely tone-mapped graphics with the reference dynamic range (202) as pre-blending graphics data 116.

Subsequently, the graphics blender (115) blends the input images received in the pre-blending video data (112) and the inversely tone-mapped graphics in the pre-blending graphics data (116), all of which images and graphics are represented in the reference dynamic range (202), into graphics blended images. The source device (100) packs the graphics blended images and the input dynamic metadata (104) in the signal format in compliance with standards/specifications governing the video interface, and outputs the graphics blended images as the source video data (122) and the input dynamic metadata (104) as the source metadata (127) to the target display (150) via the video interface. The source device (100), or the metadata regenerator (125) therein, may be free from performing metadata remapping or regeneration.

The target display (150) receives the graphics blended images in the source video data (122) and the input dynamic metadata (104) in the source metadata (127) from the source device (100) via the video interface, and performs a second mapping operation 210 to map the graphics blended images to target display capabilities using the input dynamic metadata (104) as received in the source metadata (127). Mapping the graphics blended images into the target display capabilities in the second mapping operation (210) may include, but is not necessarily limited to only, mapping the reference dynamic range (202) with which the graphics blended images are represented to the target dynamic range (206). Thus, the second mapping operation (210) may represent an inverse of the first mapping operation (208). As a result of performing the second mapping operation (210), the graphics in the graphics blended images returns from an inversely tone-mapped graphics dynamic range to the (e.g., original, pre-inversely-tone-mapped, etc.) graphics dynamic range (204).

The use of the input dynamic metadata (104) by the target display (150) serves to ensure that tone mapping of the input images (in the input video data (102)) as blended into the graphics blended images is optimized for the input images.

However, the input graphics in the input graphics data (106) have been mapped twice, one of which is an inverse tone mapping as represented by the first mapping operation (208) from the target dynamic range (206) to the reference dynamic range (202), and the other of which is a tone mapping as represented by the second mapping operation (210) from the reference dynamic range (202) to the target dynamic range (206).

In some embodiments, the first mapping operation (208) (e.g., completely, substantially, etc.) cancels the effects of the second mapping operation (210) on the graphics so that the graphics as rendered by the target display (150) is of the same graphics dynamic range (204) in the input graphics data (106).

However, in some embodiments, the first mapping operation (208) may not counteract the effects of the second mapping operation (210) on the graphics; the graphics as rendered by the target display (150) may be of deviated dynamic ranges in relation to the graphics dynamic range (204) in the input graphics data (106). This may be caused by a variety of underlying factors including but not limited to (e.g., slightly, etc.) inaccurate EDID information as transmitted by the target display (150) to the source device (100). In an example, in the EDID (108), the target display (150) may indicate/report a target dynamic range (e.g., with a maximum luminance of 850 nits, etc.) slightly different from an actual target dynamic range (e.g., with an actual maximum luminance of 825 nits, etc.) realized/implemented in the target device (150). In another example, in the EDID (108), the target display (150) may indicate/report no or different image processing algorithm from those actually used in the target display (150). In yet another example, in the EDID (108), the target display (150) may indicate/report no or different user adjustments from those actually made to the target display (150).

In some operational scenarios, the graphics such as a closed captioned text are small. In some other operational scenarios, the graphics such as menus for changing channels, electronic program guides, and the like are large. On one hand, if the graphics in the images are much smaller than non-graphics video content in the images, then visual artifacts may be too small to be noticeable or objectionable. On the other hand, if the graphics in the images are spatially sufficiently large or even cover the whole screen, then visual artifacts may become noticeable or objectionable. Example visual artifacts may include, but are not necessarily limited to only, any of: flickering, breathing (e.g., temporal visual variations, visual pulsations, etc.), other noticeable or objectionable adjustments, etc.

Example Graphics-Priority Mode

Figure 2B:
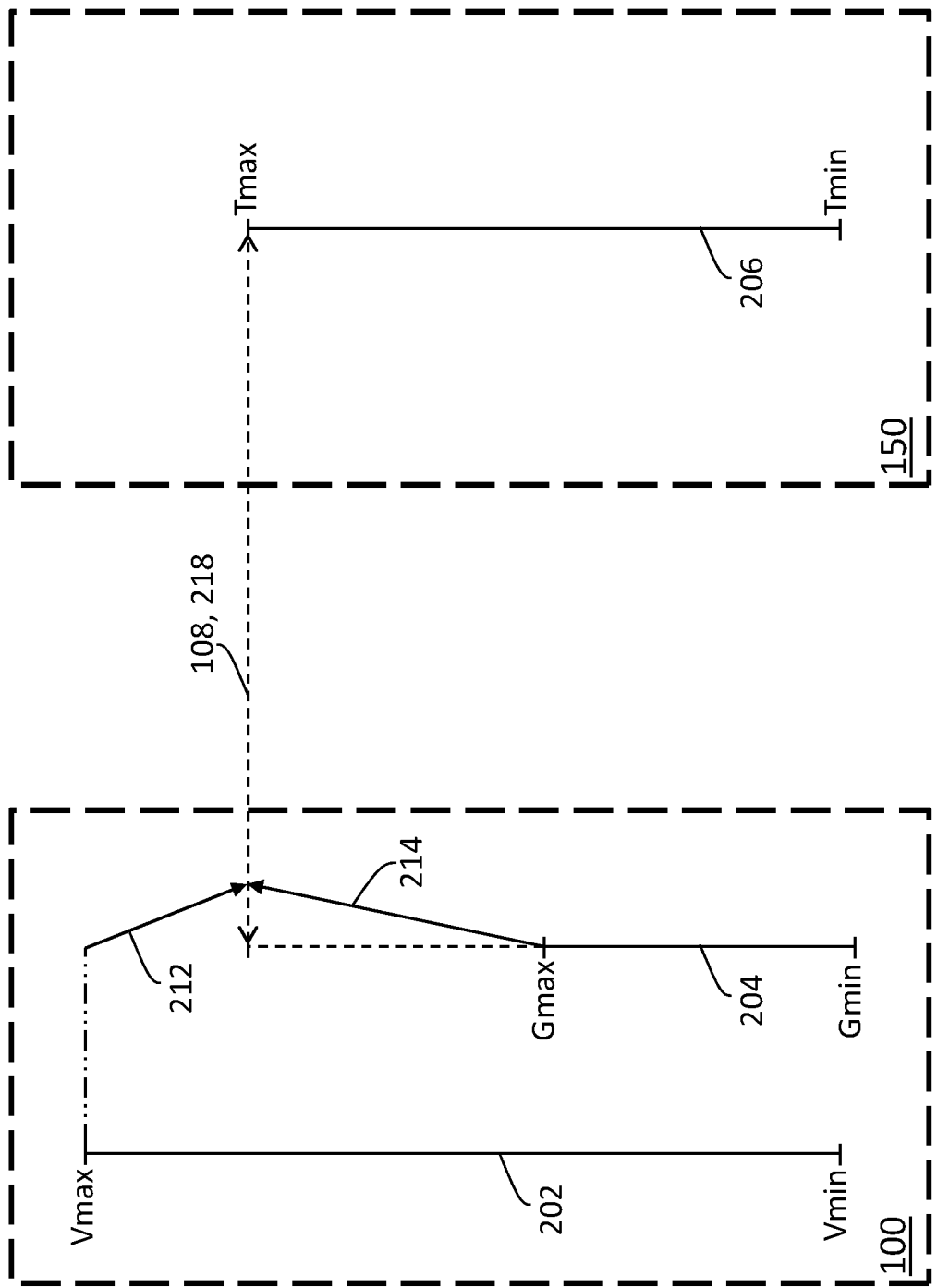
FIG. 2B illustrates an example graphics-priority mode according to an embodiment of this invention.

FIG. 2B illustrates an example second operational mode (or graphics-priority mode). As in the video-priority mode, in the graphics-priority mode, the source device (100) receives the input coded bitstream, and decodes the input coded bitstream into the input video data (102) and the input dynamic metadata (104).

The source device (100) performs a third mapping operation 212 that tone-maps input images in the input video data (102) into tone-mapped images in the target dynamic range (206) as specified in the EDID (108). The third mapping operation (212) may include a mapping from the reference dynamic range (202) as indicated in the input dynamic metadata (104) to the target dynamic range (206). The source device (100), or the metadata regenerator (125) therein, regenerates, based on the EDID (108), static metadata, which identifies/specifies the same target dynamic range (206) in which the tone-mapped images are represented. In some embodiments, the static metadata generated in the graphics-priority mode does not vary from image to image, from scene to scene, etc. The metadata regenerator (125) may receive the static metadata in metadata (114), as used in source display management operations performed by the source device (102).

In response to detecting that there exist no input graphics in the input graphics data (106) for the input images in the input video data (102) to be blended with, the source device (100) packs the tone-mapped images and the static metadata in a signal format in compliance with standards/specifications governing the video interface between the source device (100) and the target display (150), and outputs the tone-mapped images as the source video data (122) and the static metadata as the source metadata (127) to the target display (150) via the video interface. Upon receiving the tone-mapped images in the source video data (122) and the static metadata in the source metadata (127), the target display (150) determines that the static metadata indicates that the tone-mapped images are (already) represented in the target dynamic range (206), and avoids performing any tone-mapping operation between different dynamic ranges on the tone-mapped images in the source video data (122). The tone-mapped images may be directly rendered with the target dynamic range (206) as represented in the source video data (122) by the target display (150) on the display panel (135).

On the other hand, in response to detecting that there exist input graphics in the input graphics data (106) for the input images in the input video data (102) to be blended with, the source device (100) or the source display manager (110) therein performs a fourth mapping operation 214 that inversely tone-maps these input graphics into inversely tone-mapped graphics in the target dynamic range (206) as indicated in the EDID (108). The fourth mapping operation (214) may include a mapping from the graphics dynamic range (204) to the target dynamic range (206).

The graphics blender (115) receives the tone-mapped images with the target dynamic range (206) as pre-blending video data 112 and the inversely tone-mapped graphics with the same target dynamic range (206) as pre-blending graphics data 116.

Subsequently, the graphics blender (115) blends the input images received in the pre-blending video data (112) and the inversely tone-mapped graphics in the pre-blending graphics data (116), all of which images and graphics are represented in the target dynamic range (206), into graphics blended images. The source device (100) packs the graphics blended images and the static metadata in the signal format in compliance with standards/specifications governing the video interface, and outputs the graphics blended images as the source video data (122) and the static metadata as the source metadata (127) to the target display (150) via the video interface.

The target display (150) receives the graphics blended images in the source video data (122) and the static metadata in the source metadata (127) from the source device (100) via the video interface. Upon receiving the graphics blended images in the source video data (122) and the static metadata in the source metadata (127), the target display (150) determines that the static metadata indicates that the graphics blended images are (already) represented in the target dynamic range (206), and avoids performing any tone-mapping operation between different dynamic ranges on the graphics blended images in the source video data (122). The graphics blended images may be directly rendered with the target dynamic range (206) as represented in the source video data (122) by the target display (150) on the display panel (135).

Since the source metadata (127) comprises the static metadata that does not vary from image to image, from scene to scene, etc., the target display (150) is free from mapping the input dynamic range of received images in the source video data (122) to a different dynamic range. As a result, image content of input images as represented in the graphics blended images and graphics content of graphics as represented in the same graphics blended images is stable in terms of dynamic range. Thus, some or all of the visual defects/artifacts associated with the video-priority mode may be avoided under the graphics-priority mode.

However, mapping the input images in the input video data (102) to the image content of the input images as represented in the graphics blended images is performed by the source device (100) that does not render the graphics-blended images, rather than performed by the target device (150) that actually renders the graphics blended images. Such mapping as performed by the source device (100) may be sub-optimal as compared with a mapping performed by a target device (e.g., 150) that actually renders the graphics blended images. The target device (150) may have more rendering-related controls and options (e.g., backlight, user modes, supports for multiple dynamic ranges, etc.) for optimally rendering images (whether graphics blended or not), as compared with what the EDID (108) as relied on by the source device (100) specifies. Some or all of these rendering-related controls and options—which otherwise could be available for the target display (150) to select—may be disabled or affected by the static metadata, as the static metadata indicates that images in the source video data (122) have already been converted by the source device (100) into the target dynamic range (206) of the target display (150). In an example, if it is up to the target display (150) to map the source video data (122), the target display (150) may select a dynamic range with a maximum luminance of 400 nits, instead of an EDID reported maximum luminance of 850 nits. The dynamic range selected by the target display (150) may be better for rendering certain graphics blended images. In another example, if it is up to the target display (150) to map the source video data (122), the target display (150) may operate additional mapping that may not be reported in the EDID (108) that would have optimized rendering certain graphics images.

The video-priority mode and the graphics-priority mode both have valid use cases with respective advantages. Generally speaking, the video-priority mode is optimized for non-graphics video content from the input video data (102), whereas the graphics mode is optimized for graphics from the input graphics data (106). In some operational scenarios, a smooth transition between the two priority modes is desirable, for example in order to allow images without blended graphics are smoothly transitioned to images with blended graphics or vice versa in a seamless fashion. To support the smooth transition between the two priority modes, operational parameters, configurational parameters, etc., as represented in the source metadata (127)—which is associated with the source video data (122) and is sent by the source device (100) to the target display (150)—may be smoothly changed between the video-priority mode and the graphics-priority mode.

Example Metadata Associated with Video Data

In some embodiments, the source metadata (127) may comprise some or all of: video encoding parameters, source display parameters, source content gamut parameters, environmental parameters, metadata for specifying points used to divide the luminance range of the source video data (122) into specific luminance regions, etc.

The source metadata (127) may be divided or classified into different levels of metadata. In some embodiments, L0 metadata in the source metadata (127) provides/describes information about a dynamic range of a source display in which the source video data (122) is represented. In the graphics-priority mode, L0 metadata in the source metadata (127) may comprise the static metadata to indicate the target dynamic range (206) as the dynamic range of the source display in which the source video data (122) is represented. In the video-priority mode, L0 metadata in the source metadata (127) may comprise the dynamic metadata to indicate the reference dynamic range (202) as the dynamic range of the source display in which the source video data (122) is represented. In the priority-transition mode, L0 metadata in the source metadata (127) may comprise source-device regenerated dynamic metadata to indicate a dynamic range that differs from both the target dynamic range (206) and the reference dynamic range (202) as the dynamic range of the source display in which the source video data (122) is represented. The source display for the video-priority mode is the reference display used to generate the input video data (102). The source display for the graphics-priority mode is the target display (150). The source display for the priority-transition mode is not an actual display, but rather a logical display with the dynamic range (as indicated in L0 metadata) that differs from both the target dynamic range (206) and the reference dynamic range (202).

L1 metadata in the source metadata (127) provides/describes information about a distribution of luminance values in a source image, a source scene, a source GOP, etc., as represented in the source video data (122). In some embodiments, the distribution of luminance values may be represented by histograms derived based on image content (e.g., pixel values, luma values, chroma values, Y values, Cb/Cr values, RGB values, etc.) of the image, the scene, the GOP, etc. In some embodiments, the input dynamic metadata (104) as received by the source device (100) provides/describes information (e.g., in histograms, etc.) about a distribution of input luminance values in an input image, an input scene, an input GOP, etc., as represented in the input video data (102) as received by the source device. An input image, the input scene, the input GOP, etc., in the input video data (102) may be used to derive a source image, a source scene, etc., as represented in the source video data (122). The distribution of input luminance values in the input image, the input scene, the input GOP, etc., may be used to derive—for example based on a mapping from the reference dynamic range (202) as indicated in the input dynamic metadata (104) to the dynamic range of the source display as indicated in L0 metadata of the source metadata (127)—the distribution of luminance values in the source image, the source scene, the source GOP, etc., as represented in the source video data (122). As previously noted, the dynamic range of the source display as indicated in L0 metadata of the source metadata (127) respectively refers to (a) the target dynamic range (206) in the graphics-priority mode, (b) the reference dynamic range (202) in the video-priority mode, and (c) the dynamic range in the priority-transition mode that differs from both the target dynamic range (206) and the reference dynamic range (202).

In some embodiments, L1 metadata may divide the luminance range of source images (e.g., images without graphics blending, images with graphics blending, etc.) represented in the source video data (122) into specific luminance regions. For example, the luminance range of the source content into multiple regions, where the regions may be defined by points along the luminance range. Such ranges may be defined by one image, a set of images, one video scene, a plurality of video scenes. L1 metadata may be used by the target display (150) to generate/define a target display specific mapping from the dynamic range (as indicated in L0 metadata) of the source display in which the source video data (122) is represented to the target dynamic range (206). If L0 metadata in the source metadata (127) indicates the target dynamic range (206) as the dynamic range of the source display, then the target display (150) may skip mapping the dynamic range of the source display to the target dynamic range (206).

Without loss of generality, let images (e.g., in a GOP, in a scene, in multiple scene, in a media program, etc.) in video data (e.g., 102, 122, etc.) be characterized by three variables, which in an example embodiment are denoted by the variables Crush, Mid, and Clip, which denote respectively the lowest black level, the average gray level, and the highest white level, of the images. Their values can be computed for each frame, a part of a frame, a sequence of frames in a GOP, a scene, etc. The values of these parameters may either be computed based on the images or they may be part of dynamic metadata (e.g., 104, 127, etc.) associated with the images. In an embodiment, these parameters are calculated on a per-scene basis. As used herein, the term "scene" or "shot" denotes a series of sequential-in-capture frames that may share the same overall brightness characteristics.

L2 metadata provides/describes information about video characteristic adjustments that are originated from, or traced back to, adjustments made by a director, a color grader, a video professional, etc., in a production studio with a reference display with the reference dynamic range (202). In some embodiments, input L2 metadata in the input dynamic metadata (104) as received by the source device (100) may be passed to the target display (150) as source L2 metadata in the source metadata (127).

L3 metadata provides/describes information about video characteristic adjustments that are originated from, or traced back to, adjustments made by a director, a color grader, a video professional, etc., in a production studio with a second reference display with a second reference dynamic range different from the reference dynamic range (202). In some embodiments, since the source device (100) already knew that it is the target display (150) to which the source video data (122) and the source metadata (127) should be directed, the source device (100) does not need to send and does not send any L3 metadata to the target display (150). Thus, in these embodiments, the source metadata (127) may not include L3 metadata.

In some embodiments, the source metadata (127) may comprise other levels of metadata such as local dimming metadata related to the source video data (122), identifications of salient features represented in the source video data (122), etc.

Example Priority-Transition Mode

There are at least two configuration differences in the source device (100) between the video-priority mode and the graphics-priority mode.

The first configuration difference is in that the reference dynamic range (202) indicated by the input dynamic metadata (104) is set as a source dynamic range for L0 metadata in the video-priority mode for the recipient target display (150), whereas the target dynamic range (206) indicated by the EDID (108) is set as the source dynamic range for L0 metadata in the graphics-priority mode for the recipient target display (150). The maximum luminance (218) of the source dynamic range is the maximum luminance of the reference dynamic range (202) in the video-priority mode as illustrated in FIG. 2A, and the maximum luminance of the target dynamic range (206) in the graphics-priority mode as illustrated in FIG. 2B.

The second configuration difference is in that graphics in the input graphics data (106) are inversely mapped to the reference dynamic range (202) indicated by the input dynamic metadata (104) in the video-priority mode, whereas graphics in the input graphics data (106) are inversely mapped to the target dynamic range (206) indicated by the EDID (108) in the graphics-priority mode. However, the dynamic range to which the graphics are inversely mapped in a given mode is represented by the same L0 metadata in that mode. More specifically, the dynamic range to which the graphics are inversely mapped in the video-priority mode is the reference dynamic range (202) as represented by L0 metadata in the video-priority mode, whereas the dynamic range to which the graphics are inversely mapped in the graphics-priority mode is the target dynamic range (206) as represented by L0 metadata in the video-priority mode.

Thus, the same metadata can be passed by the source device (100) to the target display (150) over HDMI to indicate the source dynamic range for the source video data (122) and to indicate the dynamic range (which has the same maximum luminance (218) as the source dynamic range) to which the graphics have been inversely mapped.

Figure 2C:
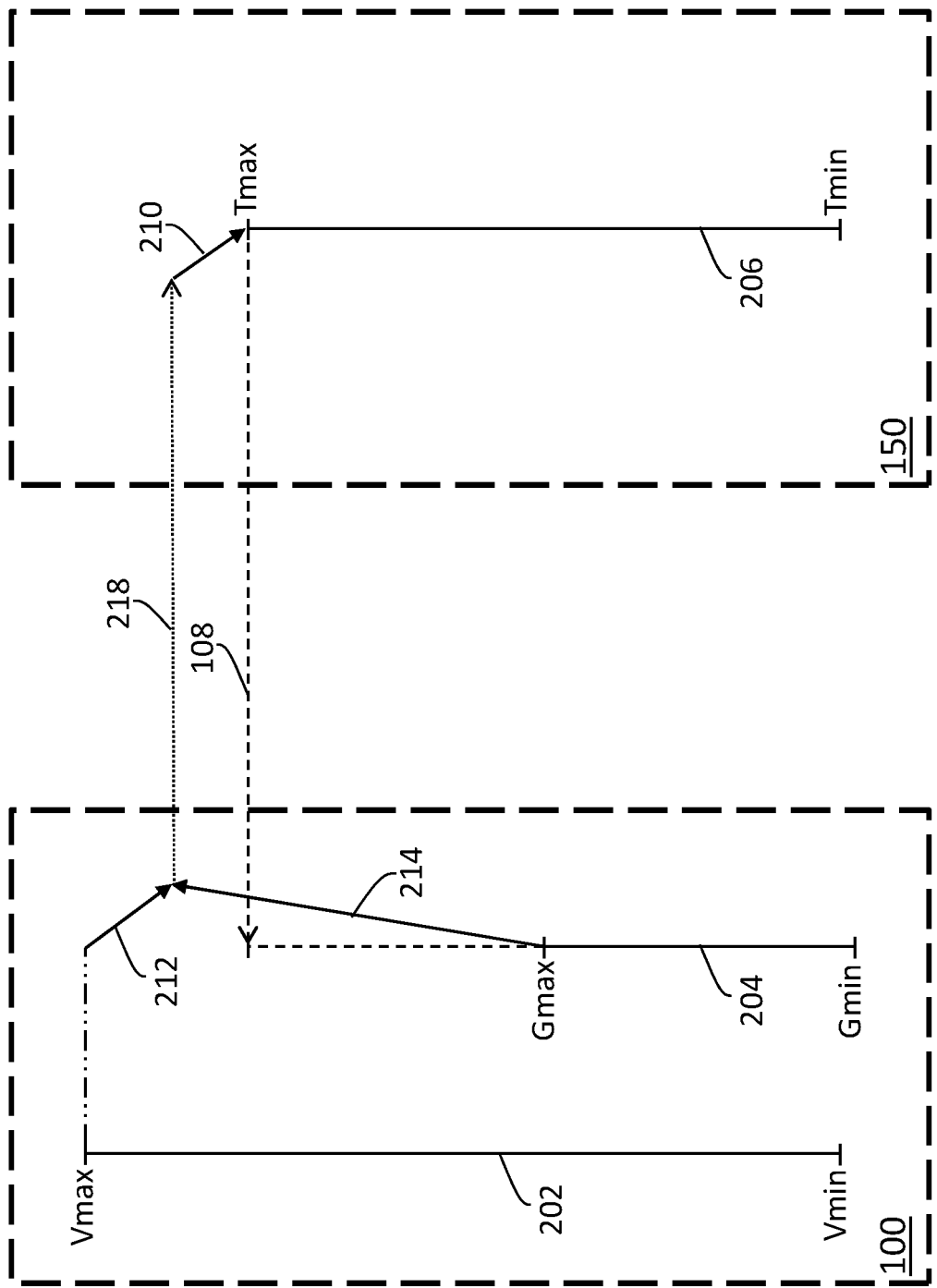
FIG. 2C illustrates an example priority-transition mode according to an embodiment of this invention.

FIG. 2C illustrates an example third operational mode (or priority-transition mode). When the source device (100) operates in the priority-transition mode between the video-priority mode and the graphics-priority mode, the source device or the metadata regenerator (125) therein generates the source metadata (127) comprising operational parameters, configurational parameters, etc., that are blended or interpolated from corresponding operational parameters, corresponding configurational parameters, etc., in the video-priority mode and in the graphics-priority mode. The regeneration of the source metadata (127) by the metadata regenerator (125) may be at least in part based on the metadata (114)—which in the graphics-priority mode represents interpolated dynamic metadata—used in source display management operations performed by the source device (102).

In some embodiments, L1 metadata in connection with the priority-transition mode is interpolated by the source device (100) between L1 metadata as received from the input dynamic metadata (104) and static values based on the EDID (108) as received from the target display (150). L2 metadata as received from the input dynamic metadata (104) may be passed through unchanged by the source device (100) to the target display (150). L4 metadata (e.g., used for local dimming operations, etc.) may be interpolated between L4 metadata as received from the input dynamic metadata (104) and static values (e.g., 4000 nits as indicated for the reference display in the input dynamic metadata (104), etc.). In some embodiments, endpoint values for the interpolated values in the priority-transition mode are exactly the same as those in either the video-priority mode or the graphics-priority mode.

For the purpose of illustration, as in the video-priority mode and the graphics-priority mode, the source device (100) receives the input coded bitstream, and decodes the input coded bitstream into the input video data (102) and the input dynamic metadata (104).

The source device (100) performs the third mapping operation (212) that tone-maps input images in the input video data (102) into tone-mapped images in a source dynamic range that has the maximum luminance (218) interpolated from the maximum luminance of the reference dynamic range (202) and the maximum luminance of the target dynamic range (206) and that has the minimum luminance interpolated from the minimum luminance of the reference dynamic range (202) and the minimum luminance of the target dynamic range (206). In some embodiments, the maximum luminance (218) and the minimum luminance of the source dynamic range to which the input images are tone-mapped by the source device (100) are determined as follows:

$$\text{DMParams.TmaxPQ} = \text{DMParams.SmaxPQ} * \text{alpha} + \text{SinkParams.TmaxPQ} * (1-\text{alpha}) \quad (1)$$

$$\text{DMParams.TminPQ} = \text{DMParams.SminPQ} * \text{alpha} + \text{SinkParams.TminPQ} * (1-\text{alpha}) \quad (2)$$

where DMParams.TmaxPQ and DMParams.TminPQ respectively represent the maximum luminance (218) and the minimum luminance of the source dynamic range for the source video data (122) sent by the source device (100) to the target display (150); DMParams.SmaxPQ and DMParams.SminPQ respectively represent the maximum luminance (Vmax) and the minimum luminance (Vmin) of the reference dynamic range (202) that is used to master the input video data (102) received by the source device (100); SinkParams.TmaxPQ and SinkParams.TminPQ respectively represent the maximum luminance (Tmax) and the minimum luminance (Tmin) of the target dynamic range (206) of the target display (150); and alpha represents a numeric interpolation factor in a value range [0, 1].

When the source device (100) operates in the video-priority mode, the numeric interpolation factor alpha is set to 1. When the source device (100) operates in the graphics-priority mode, the numeric interpolation factor alpha is set to 0. When the source device (100) operates in the priority-transition mode, the numeric interpolation factor alpha is set to an intermediate value between 0 and 1.

The third mapping operation (212) may include a mapping from the reference dynamic range (202) as indicated in the input dynamic metadata (104) to the source dynamic range delineated by the left hand sides (LHSs) of expression (1) and expression (2) above. In some embodiments, the mapping from the reference dynamic range (202) to the source dynamic range may be configured (e.g., as a smoothened curve, as a sigmoid curve, etc.) based on tone-mapping parameters as follows:

$$\text{OutputMetadata.Level1.Crush} = \text{Metadata.Level1.Crush} * \text{alpha} + \text{SinkParams.TminPQ} * (1-\text{alpha}) \quad (3)$$

$$\text{OutputMetadata.Level1.Mid} = \text{Metadata.Level1.Mid} * \text{alpha} + \text{mean}([\text{SinkParams.TminPQ SinkParams.TmaxPQ}]) * (1-\text{alpha}) \quad (4)$$

$$\text{OutputMetadata.Level1.Clip} = \text{Metadata.Level1.Clip} * \text{alpha} + \text{SinkParams.TmaxPQ} * (1-\text{alpha}) \quad (5)$$

where OutputMetadata.Level1.Crush, OutputMetadata.Level1.Mid and OutputMetadata.Level1.Clip represent the lowest black level, the average gray level and the highest white level of source images represented in the source video data (122); and Metadata.Level1.Crush, Metadata.Level1.Mid and Metadata.Level1.Clip represent the lowest black level, the average gray level and the highest white level of corresponding input images represented in the input video data (102), which are used to derive the source images represented in the source video data (122).

In some embodiments, the source device (100), or the source display manager (110) therein, performs the fourth mapping operation (214) that inversely tone-maps input graphics in the input graphics data (106) into inversely tone-mapped graphics in the same source dynamic range delineated by the LHSs of expression (1) and expression (2) above. The fourth mapping operation (214) may include a mapping from a clipping-free graphics dynamic range to the source dynamic range. In some embodiments, the maximum luminance (218) and the minimum luminance of the clipping-free graphics dynamic range to which the input graphics are inversely tone-mapped by the source device (100) are determined as follows:

$$\text{GraphicsParams.SmaxPQ} = \max(\text{GraphicsParams.SmaxPQ}, \text{SinkParams.TmaxPQ}) \quad (6)$$

$$\text{GraphicsParams.SminPQ} = \min(\text{GraphicsParams.SminPQ}, \text{SinkParams.TminPQ}) \quad (7)$$

where GraphicsParams.SmaxPQ and GraphicsParams.SminPQ on the LHSs of expression (6) and expression (7) respectively represent the maximum luminance and the minimum luminance of the clipping-free graphics dynamic range (204) as previously mentioned; and GraphicsParams.SmaxPQ and GraphicsParams.SminPQ on the right hand sides (RHSs) of expression (6) and expression (7) respectively represent the maximum luminance (Gmax) and the minimum luminance (Gmin) of the graphics dynamic range (204) that is used to generate the input graphics data (106) received by the source device (100).

The fourth mapping operation (214) may include a mapping from the clipping-free graphics dynamic range delineated by the left hand sides (LHSs) of expression (6) and expression (7) above to the source dynamic range delineated by the left hand sides (LHSs) of expression (1) and expression (2) above. In some embodiments, the mapping from the clipping-free graphics dynamic range to the source dynamic range may be configured (e.g., as a smoothened curve, as a sigmoid curve, etc.) based on tone-mapping parameters as follows:

$$\text{GraphicsMetadata.Level1.Crush} = \text{Metadata.Level1.Crush} * \text{alpha} + \text{GraphicsParams.SminPQ} * (1-\text{alpha}) \quad (8)$$

$$\text{GraphicsMetadata.Level1.Mid} = \text{Metadata.Level1.Mid} * \text{alpha} + \text{mean}([\text{GraphicsParams.SmaxPQ GraphicsParams.SminPQ}]) * (1-\text{alpha}) \quad (9)$$

$$\text{GraphicsMetadata.Level1.Clip} = \text{Metadata.Level1.Clip} * \text{alpha} + \text{GraphicsParams.SmaxPQ} * (1-\text{alpha}) \quad (10)$$

where GraphicsMetadata.Level1.Crush, GraphicsMetadata.Level1.Mid and GraphicsMetadata.Level1.Clip represent the lowest black level, the average gray level and the highest white level of graphics to be included in the source images represented in the source video data (122).

The graphics blender (115) receives the tone-mapped images with the source dynamic range as pre-blending video data 112 and the inversely tone-mapped graphics with the same source dynamic range as pre-blending graphics data 116.

Subsequently, the graphics blender (115) blends the input images received in the pre-blending video data (112) and the inversely tone-mapped graphics in the pre-blending graphics data (116), all of which images and graphics are represented in the same source dynamic range, into graphics blended images.

The source device (100), or the metadata regenerator (125) therein, regenerates interpolated dynamic metadata (e.g., as L0 metadata, LHSs of expression (1) and expression (2), etc.) that identifies/specifies the source dynamic range in which the tone-mapped images in the source video data (122) are represented. Additionally, optionally, or alternatively, the source device (100), or the metadata regenerator (125) therein, regenerates interpolated dynamic metadata (e.g., as L1 metadata, LHSs of expression (4), expression (5) and expression (5), etc.) that identifies/specifies the luminance characteristics of the tone-mapped images or the source images represented in the source video data (122). In some embodiments, the interpolated dynamic metadata generated in the priority-transition mode varies from image to image, from GOP to GOP, from scene to scene, etc.

The source device (100) packs the graphics blended images and the interpolated dynamic metadata in the signal format in compliance with standards/specifications governing the video interface, and outputs the graphics blended images as the source video data (122) and the interpolated dynamic metadata as the source metadata (127) to the target display (150) via the video interface.

The target display (150) receives the graphics blended images in the source video data (122) and the interpolated metadata in the source metadata (127) from the source device (100) via the video interface. Upon receiving the graphics blended images in the source video data (122) and the interpolated dynamic metadata in the source metadata (127), the target display (150) determines that the interpolated dynamic metadata indicates that the graphics blended images are represented in the source dynamic range as delineated by the LHSs of expression (1) and expression (2) above that is different from the target dynamic range (206), and proceeds to perform a tone-mapping operation between the source dynamic range and the target dynamic range (20) on the graphics blended images in the source video data (122). The graphics blended images as tone mapped may be rendered with the target dynamic range (206) by the target display (150) on the display panel (135).

Transitioning Between Video Priority and Graphics Priority

A source device (e.g., 100, etc.) as described herein may use the priority-transition mode between the video-priority mode and the graphics-priority mode in any of a wide variety of ways. As noted before, the video-priority mode is relatively optimized for video content of source images (e.g., in source video data (122), etc.) that is derived from input video data (e.g., 102, etc.) received by the source device (100). In contrast, the graphics-priority mode is relatively optimized for graphics content of source images (e.g., in source video data (122), etc.) that is derived from input graphics data (e.g., 106, etc.) received by the source device (100).

In an example, graphics that initially occupies an inconspicuous location (e.g., a corner) of a display panel (e.g., 135, etc.) may be designed to fly in from the inconspicuous location and occupy a relatively large portion of the display panel (135). There may be a short time interval such as 0.3, 0.5 second, 1 second, etc., during which the graphics completes this fly-in process from the inconspicuous location to the relatively large portion of the display panel (135). Up to the beginning of this fly-in process (e.g., as implemented in a media playing application running on the source device (100), etc.), the source device (100) operates in the video-priority mode. At the end of this fly-in process, the source device (100) operates in the graphics-priority mode. The priority-transition mode may be used over some or all of the short time interval to transition from the video-priority mode to the graphics-priority mode. In some embodiments, this transition from the video-priority mode to the graphics-priority mode may be relatively smooth, effectuated by relatively smoothly varying the numeric interpolation factor alpha used in the priority-transition mode.

In another example, graphics that initially occupies a relatively large portion of the display panel (135) may be designed to fly out to an inconspicuous location (e.g., a corner) of the display panel (135). There may be a short time interval such as 0.3, 0.5 second, 1 second, etc., during which the graphics completes this fly-out process from the relatively large portion to the inconspicuous location of the display panel (135). Up to the beginning of this fly-out process (e.g., as implemented in a media playing application running on the source device (100), etc.), the source device (100) operates in the graphics-priority mode. At the end of this fly-out process, the source device (100) operates in the video-priority mode. The priority-transition mode may be used over some or all of the short time interval to transition from the graphics-priority mode to the video-priority mode. In some embodiments, this transition from the graphics-priority mode to the video-priority mode may be relatively smooth, effectuated by relatively smoothly varying the numeric interpolation factor alpha used in the priority-transition mode.

In yet another example, a user may press one or more buttons (e.g., pause button, menu button, menu exit button, etc.) while watching a video program or live TV that triggers displaying graphics. In response to such user action(s), external events, etc., the source device (100) may operate with the priority-transition mode over a short time interval to transition between the video-priority mode and the graphics-priority mode and vice versa.

The numeric interpolation factor alpha used in the priority-transition mode may be represented as a function of time. Examples of functions representing the numeric interpolation factor over time may include, but are not necessarily limited to only, any of: relatively smoothly varying functions, relatively abrupt (with discontinuity of different orders), analytical functions, linear functions, non-linear functions, exponential functions, logarithmic functions, non-analytical functions, step functions, etc. The numeric interpolation factor alpha may be programmatically determined (e.g., automatically without any user input, in combination with user input, depending on sizes of graphics, depending on video content, etc.), event driven (e.g., button pressing, user interface events, etc.), by default (e.g., 0.5 second, a specific curve, a specific function, etc.), exposed to a user interface designer of a media consuming/playing application, exposed to a user of the source device, etc.

Example Pixel-Based Blending Mode

All methods discussed earlier apply the priority mode (e.g., video or graphics) to the entire image. This may be appropriate when the image is primarily video content; however, when logos or other graphics (e.g., menus, captions, and the like) are inserted, it may not be appropriate to modify them on a scene-by-scene basis.

As discussed earlier, in some embodiments, playback switches between a "video priority mode," where display management is based on dynamic metadata, and a "graphics priority mode," where display management is based on static metadata. A third "priority transition mode" allows for modes to be smoothly interpolated in between the two primary modes. These modes provide a trade-off between video quality and stability for the graphics; however, while it is desirable to have the best video quality and the best stability for the graphics, this may not be possible when a priority is selected for the entire image.

Figure 1C:
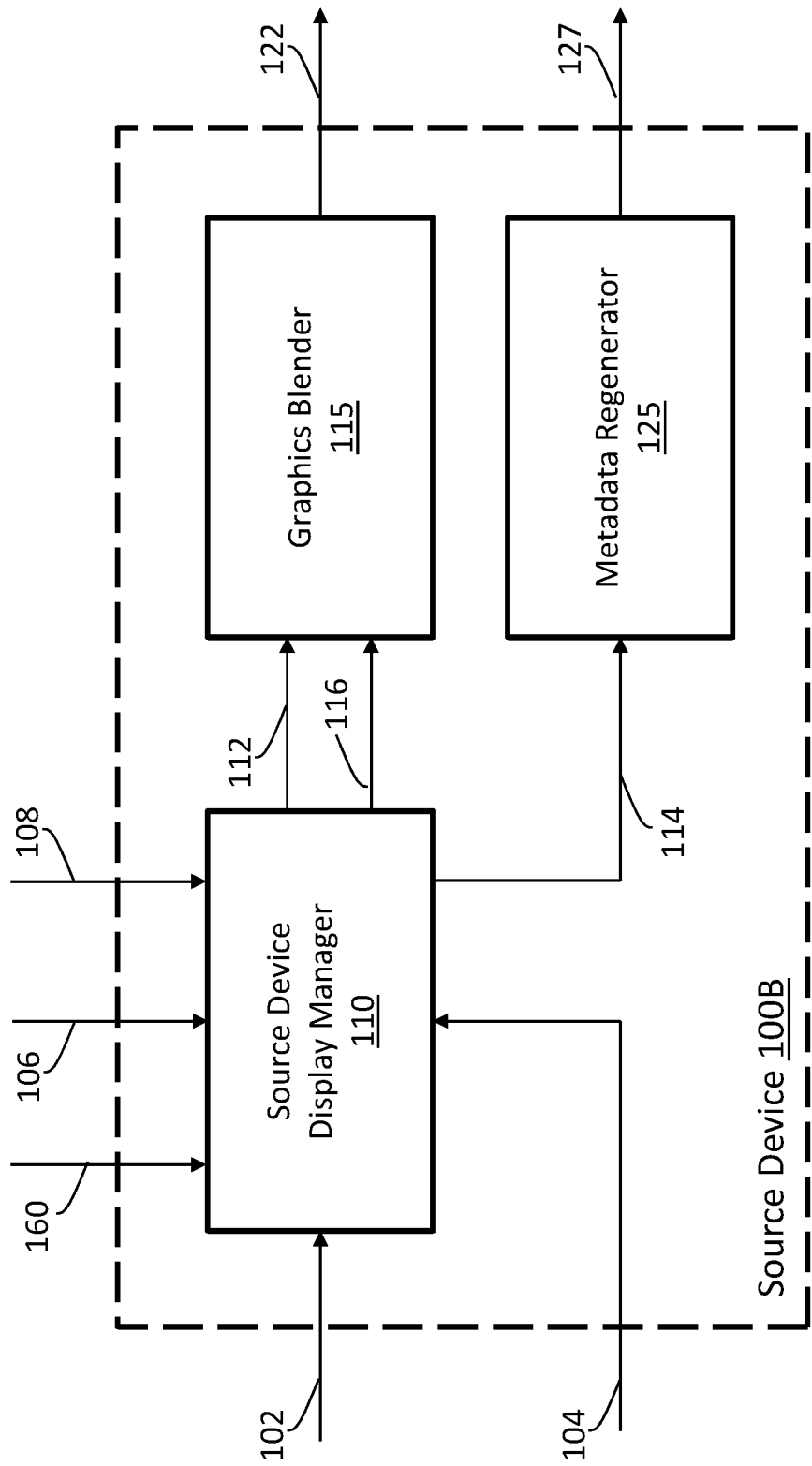

In an embodiment, priority may be indicated on a per-pixel basis, for a "pixel-based blending mode," or "per-pixel priority." As depicted in FIG. 1C, in an embodiment, source device display manager (110) may receive video (102) and graphics (106). In addition, it may receive metadata (104), display related information (108), and an "alpha" (or blending) priority map (160) which characterizes whether one or more pixels in a blended image have "video priority" or "graphics priority." In some embodiments, the source itself may also modify the incoming per-pixel priority after it injects its own graphics with the incoming video. In one embodiment, the blending priority map may have only binary values (e.g., 0 or 1), but in another embodiment, it may include values in [0, 1] or in some other suitable range and/or representation.

Given the existence of legacy source and/or target devices on the field which may or may not be able to support the per-pixel priority, in the next section, without limitation, a number of example scenarios are discussed.

A. Source-Device Image and Graphics Blending with Target-Device Per-Pixel Mapping In one embodiment, on the source device 100B, video (112) and graphics (116) are blended together as discussed earlier. For example, given input video(i) and graphics(i), the blender (115) in the source device may generate an output pixel as:

$$\text{output}(i)=\text{alpha}(i)*\text{video}(i)+(1-\text{alpha}(i))*\text{graphics}(i), \quad (11)$$

where alpha(i) denotes a blending value (e.g., a value in [0, 1]) for the i-th pixel.

The alpha priority map (160) is also embedded to the metadata (127) to be transmitted to the target (150), which receives a single, blended video image (122) and metadata (127) that include the alpha map.

Figure 2D:
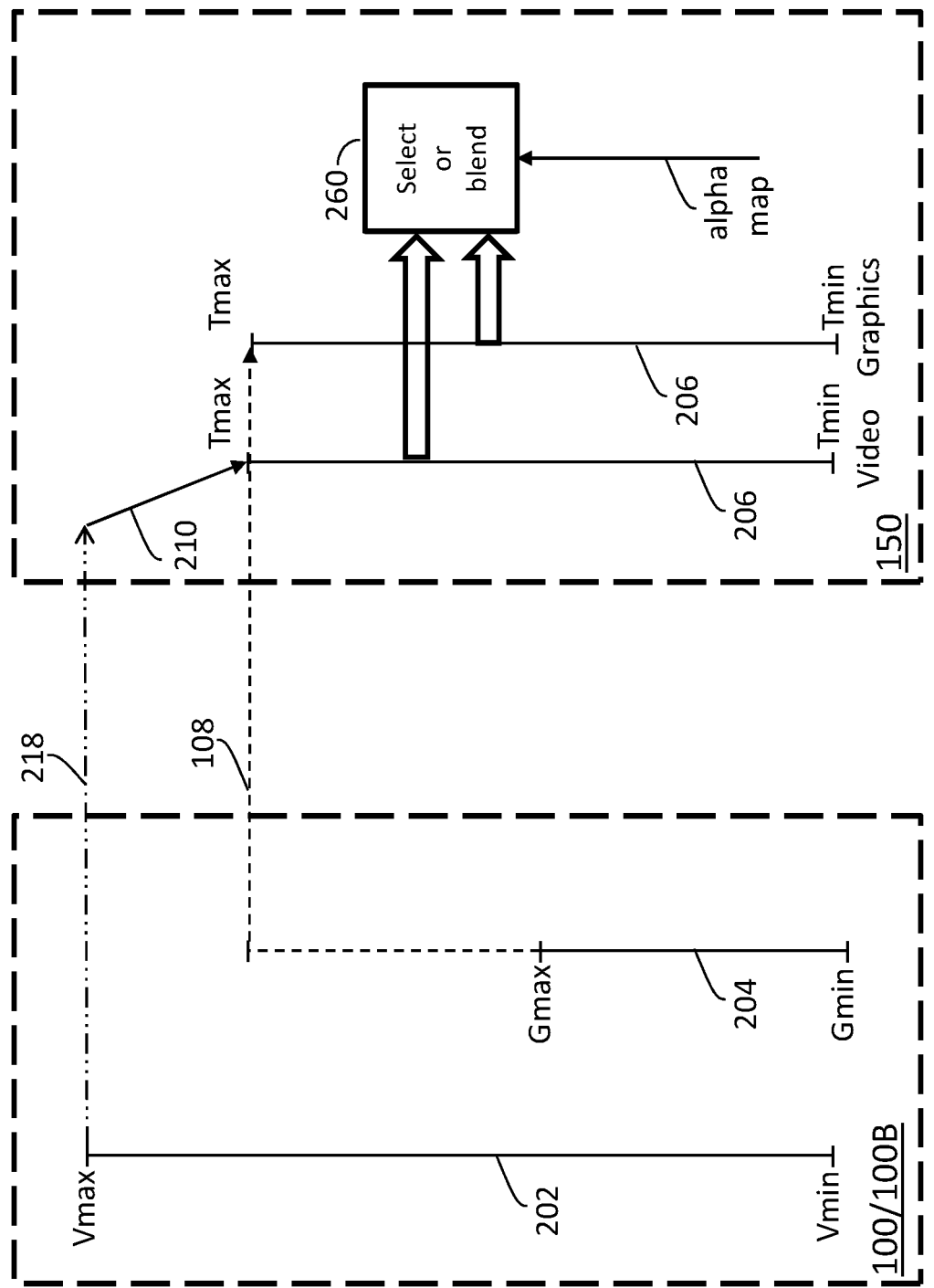
FIG. 2D illustrates a first example of pixel-based blending mode according to an embodiment of this invention.

On the target device (150), as depicted in FIG. 2D, the target will prepare two tone-mapping curves: one for the video data, using the dynamic metadata, and one for the graphics data, using the static metadata. For example, as depicted in FIG. 2D, (Vmin, Vmax) of the video reference dynamic range (202) are mapped to (Tmin, Tmax) of the target dynamic range (206). Similarly, (Gmin, Gmax) of the reference graphics dynamic range (204) are mapped to (Tmin, Tmax) of the target dynamic range (206).

Given the two mapping curves, the received blended image, and the received alpha priority map (e.g., 160), a switch (260) in the target device will generate an output based on pixel-based decisions. For example, assuming a map value of $\alpha(i)=1$ indicates that the i-th pixel has a graphics priority, then if $\alpha(i)=1$, then generate the i-th output pixel by applying the graphics tone-map curve to the input blended pixel;

else if $\alpha(i)$ 0, then generate the i-th output pixel by applying the video tone-map curve to the input blended pixel;

else, generate the i-th output pixel by applying appropriate blending between the graphics- and video-tone-mapped data.

In an example generalized form, this may be expressed as:

$$\text{output}(i)=(i)*R\text{graphics}(i)+(1-\alpha(i))*R\text{video}(i), \quad (12)$$

where $\alpha(i)$ now denotes the alpha value (e.g., a value in [0, 1]) for the i-th pixel generated based on the alpha priority map, Rvideo(i) denotes an input video pixel mapped to the dynamic range of the target display using the dynamic metadata, and Rgraphics(i) denotes an input graphics pixel mapped to the dynamic range of the target display using the static metadata.

B. Source-Device Pass-Through with Target-Device Blending and Per-Pixel Mapping

In another embodiment, there is no blending on the source device. Given video (112), graphics (116), and alpha map (160), the video and graphics images are passed as is to the target device, e.g., via interface 122. As before, the alpha map (160) is also embedded into the metadata (127) to be transmitted to the target (150), which receives two images: video image and graphics, and metadata (127) that include the alpha map.

On the target (150), as depicted in FIG. 2D, the target will again prepare two tone-mapping curves: one for the video data, using the dynamic metadata, and one for the graphics data, using the static metadata. Given: the two mapping-curves, the two received images, and the received alpha map (e.g., 160), then, the blender (260) in the target device will generate again an output pixel value per equation (12).

C. Source-Device Per-Pixel Mapping with No Target-Device Mapping

In an embodiment, the target device (150) may be a legacy device with no support for per-pixel blending, but per-pixel blending may be supported on the source device. Under such a scenario, a source device (100B) may receive from a studio or other source an input comprising a blended video with graphics (102), the alpha mapping (160), and other metadata. Given EDID data (108) from the target device, as depicted in FIG. 2E, in response to detecting a blended video with graphics input (202), the source may generate two tone maps mapping the (Vmin, Vmax) and (Gmin, Gmax) ranges to the (Tmin, Tmax) range of the target device; one (262), based on static source metadata for graphics and one (264), based on dynamic source metadata for video. Given the two mappings, the source device may use selector (260) to generate an output tone-mapped image (270) based on per-pixel decisions, for example, using equation (12).

Given the tone-mapped output (270) from the source device, the target display (150) will determine that the received input (270) is already in the target dynamic range, and the input video with blended graphics (270) will be rendered directly by the target display (150) on the display panel (135).

If neither the source nor the target devices support per-pixel mapping, then these devices will ignore the alpha mapping information and will operate as discussed in the previous sections of this disclosure.

In some embodiment, even though there may not be hardware support for performing per-pixel blending, a source or a target device may use information from the alpha mapping to decide whether to apply the video-priority or the graphics-priority to the whole frame. For example, in an embodiment, such a decision may be made according to the majority mode of pixels in the alpha mapping.

In some embodiments, prior to blending, the video and graphics data may be converted to a common color space, e.g., in RGB, YCbCr, or the ICtCp color space as defined in ITU-R Rec. BT.2100 (July 2016), which is incorporated herein by reference.

To reduce the size of metadata related to blending, the blending map may be compressed (e.g., using known compression schemes, like zip, JPEG, and the like), or it may be constrained to specific geometric shapes (say, circles or rectangles) so the map may be communicated using just a few parameters (say, width, height of a rectangle or the radius of a circle).

A pixel-based blending mode may also be used by distribution encoders (e.g., during a live broadcast), before compressing the content and transmitting it to playback devices.

Example Process Flows

Figure 3:
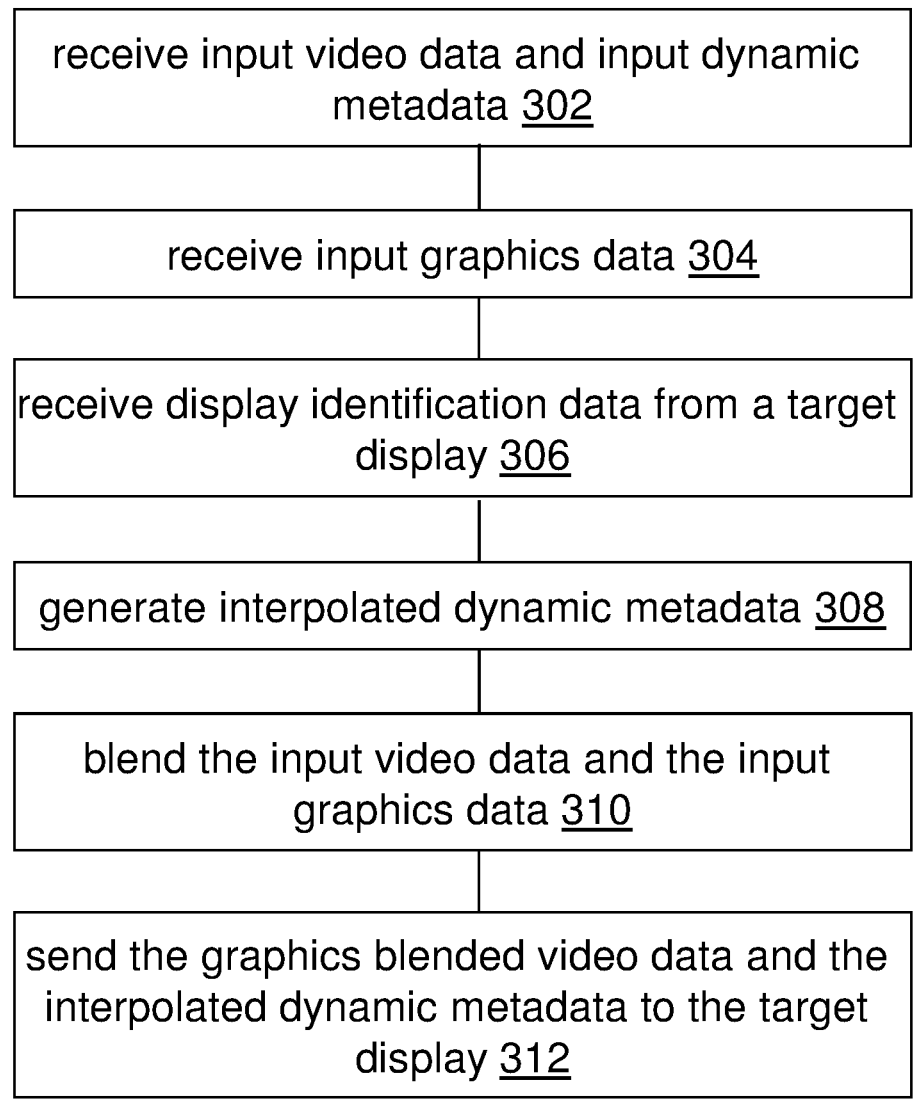
FIG. 3 illustrate an example process flow according to an embodiment of this invention.

FIG. 3 illustrates an example process flow according to an embodiment of the present invention. In some embodiments, one or more computing devices or components (e.g., an encoding device/module, a transcoding device/module, a decoding device/module, a tone mapping device/module, a graphic blending device, an image blending device/module, a media device/module, etc.) may perform this process flow. In block 302, a media receiver, such as a source device (100) and the like, receives input video data and input dynamic metadata for the input video data. The input video data is at a video dynamic range.

In block 304, the media receiver receives input graphics data at a graphics dynamic range different from the video dynamic range.

In block 306, the media receiver receives display identification data from a target display to which the video receiver is linked over a video interface.

In block 308, the media receiver generates, based at least in part on (a) the input dynamic metadata, (b) the display identification data, and (c) a numeric interpolation factor, interpolated dynamic metadata to operate a priority-transition mode for transitioning between a video-priority mode and a graphics-priority mode.

In block 310, the media receiver blends the input video data and the input graphics data based at least in part on the interpolated dynamic metadata into graphics blended video data.

In block 312, the media receiver sends the graphics blended video data and the interpolated dynamic metadata to the target display for rendering graphics blended images represented in the graphics blended video data.

In an embodiment, the display identification data from the target display specifies a target dynamic range of the target display; the interpolated dynamic metadata specifies a source dynamic range that has a maximum luminance interpolated between a maximum luminance of the video dynamic range and a maximum luminance of the target dynamic range.

In an embodiment, the media receiver is further configured to perform: generating tone-mapped video data of the source dynamic range from the input video data of the video dynamic range by mapping the video dynamic range of the input video data to the source dynamic range specified in the interpolated dynamic metadata; generating mapped graphics data of the source dynamic range from the input graphics data of the graphics dynamic range by mapping the graphics dynamic range of the input graphics data to the source dynamic range specified in the interpolated dynamic metadata; generating the graphics blended video data by blending the tone-mapped video data of the source dynamic range and the mapped graphics data of the source dynamic range; etc.

In an embodiment, the display identification data from the target display specifies a target dynamic range of the target display; the interpolated dynamic metadata specifies a source dynamic range that has a maximum luminance interpolated between a maximum luminance of the video dynamic range and a maximum luminance of the target dynamic range; the interpolated dynamic metadata causes the target display to perform a tone-mapping operation on the graphics blended video data from the source dynamic range as specified in the interpolated dynamic metadata to the target dynamic range.

In an embodiment, the media receiver continuously operates in the priority-transition mode over a contiguous time interval separating the video-priority mode and the graphics-priority mode.

In an embodiment, the numeric interpolation factor represents a function of time.

In an embodiment, the display identification data represents extended display identification data (EDID), E-EDID, DisplayID, etc.

In an embodiment, the media receiver is further configured to perform: while the media receiver is operating in the video-priority mode, sending, to the target display, video content at the video dynamic range. The video content at the video dynamic range is derived directly from the input video data without mapping between different dynamic ranges.

In an embodiment, the media receiver is further configured to perform: while the media receiver is operating in the graphics-priority mode, sending, to the target display, tone-mapped video content at the target dynamic range. The tone-mapped video content at the video dynamic range is derived from the input video data by mapping the input video data from the video dynamic range to the target dynamic range.

In an embodiment, at least one of the input video data and the graphics blended video data is represented by perceptually quantized codeword values.

In an embodiment, at least one of the input video data and the graphics blended video data is represented by non-perceptually quantized codeword values.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
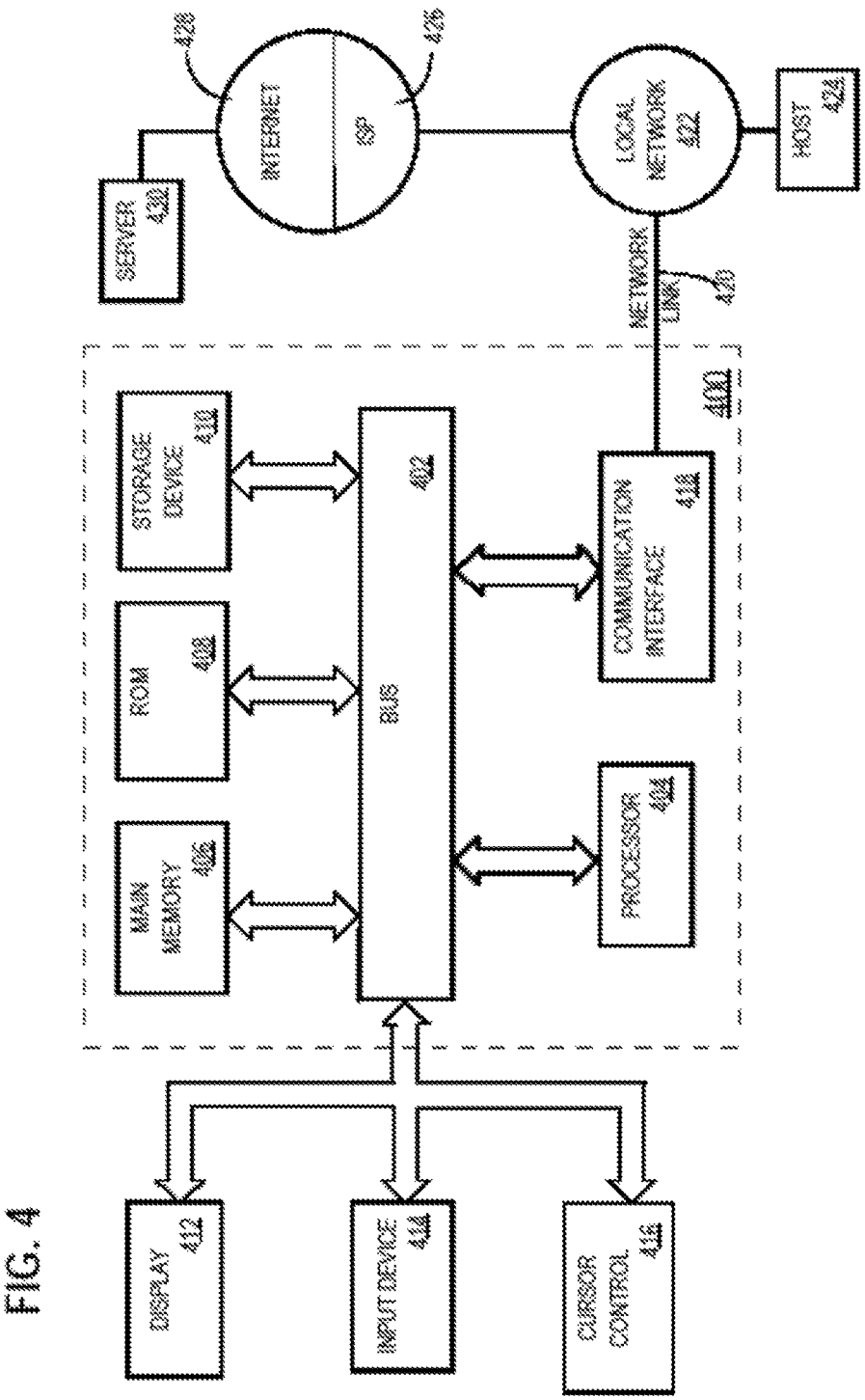
FIG. 4 illustrates a simplified block diagram of an example hardware platform on which a computer or a computing device as described herein may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques as described herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. In a video receiver, a method for mapping input data to a target display, the method comprising:

receiving a blended video input, wherein the blended video input comprises blended video and graphics data, input dynamic metadata for the video data in the blended video input, and input static metadata for the graphics data in the blended video input;

receiving an indication of a target display dynamic range from the target display to which the video receiver is linked over a video interface;

receiving a blending priority map characterizing per-pixel priority modes in the blended video input;

generating, using the input dynamic metadata data, a video tone-mapping function to map video pixels, of a video dynamic range, in the blended video input to output video data in the target dynamic range;

generating, using the input static metadata data, a graphics tone-mapping function to map graphics pixels, of a graphics dynamic range different from the video dynamic range, in the blended video input to output graphics data in the target dynamic range;

rendering blended video output data at the target dynamic range based on the blended video input data, the video tone-mapping function, the graphics tone-mapping function, and the blending priority map, the blended video output data being a blending of the output video data and the output graphics data in the target dynamic range; and sending the blended video output data to the target display;

wherein rendering an output(i) pixel of the blended video data at the target dynamic range comprises computing:

$$\text{output}(i) = \alpha(i) * R\text{graphics}(i) + (1 - \alpha(i)) * R\text{video}(i),$$

wherein i denotes a pixel index; Rvideo(i) denotes an input video pixel mapped to the target dynamic range based on the video tone-mapping function, Rgraphics(i) denotes an input graphics pixel mapped to the target dynamic range based on the graphics tone-mapping function, and α(i) denotes a blending value based on the blending priority map.

2. An apparatus comprising a processor and configured to perform the method recited in claim 1.

3. A non-transitory computer-readable storage medium having stored thereon computer-executable instruction for executing a method with one or more processors in accordance with claim 1.

* * * * *